Dec. 18, 1928.
S. T. WOODHULL
1,695,989
ELECTROLYTIC CELL
Filed June 23, 1926
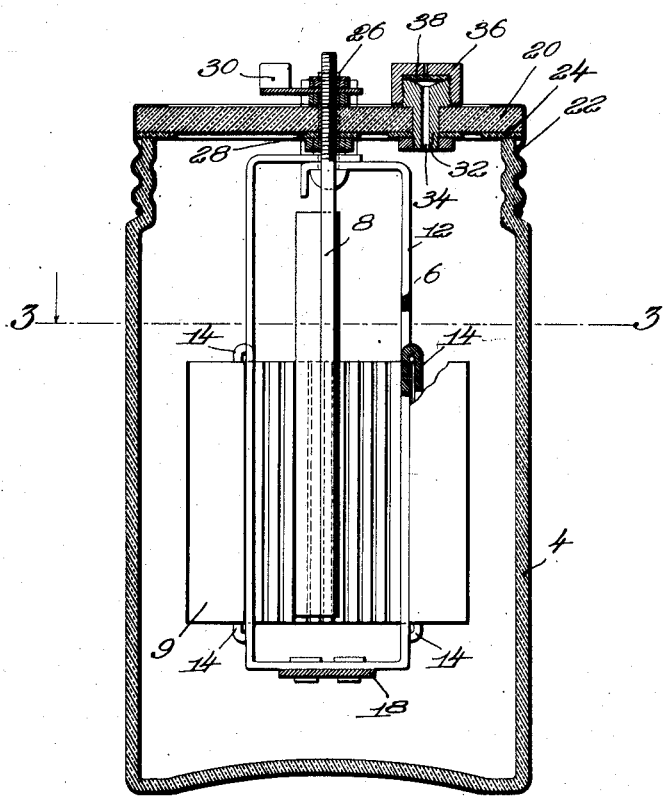
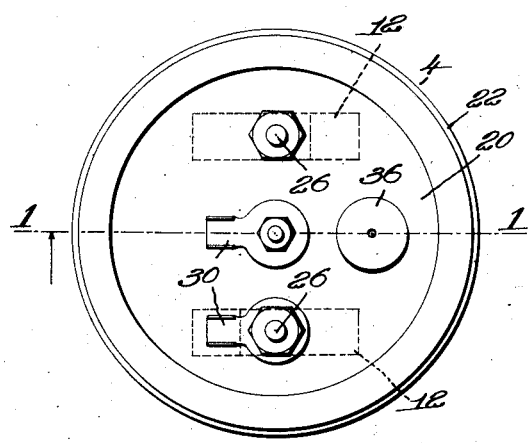
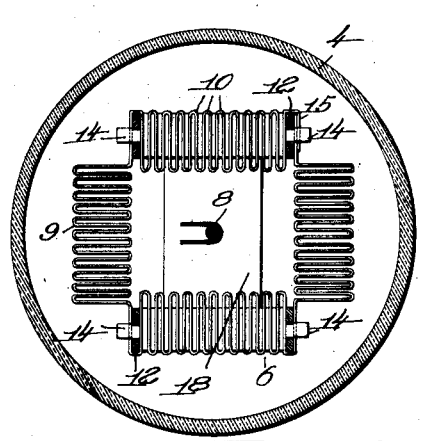

Patented Dec. 18, 1928.

1,695,989

UNITED STATES PATENT OFFICE.

SAMUEL T. WOODHULL, OF WINCHESTER, MASSACHUSETTS, ASSIGNOR TO THE AMRAD CORPORATION, OF MEDFORD, MASSACHUSETTS, A CORPORATION OF OHIO.

ELECTROLYTIC CELL.

Application filed June 23, 1926. Serial No. 117,987.

The present invention relates to electrolytic cells and more particularly to electrolytic cells to be employed as condensers, rectifiers, and the like.

The usual form of electrolytic cell, particularly when used as a condenser, includes a filming electrode of large surface which is immersed in a suitable electrolyte. The filming electrode is usually of very thin material and is constructed with a large number of closely spaced folds to give an extended surface. Inasmuch as removal or loss of the film from any part of the electrode will permit direct electrical conduction through the electrolyte, it is necessary that the adhesion of the film over the entire surface of the electrode be maintained unimpaired. Damage to the film may sometimes result from excessive electrical stress or from mechanical shocks, particularly when accompanied by friction between adjacent folds of the electrode. Destruction of a portion of the film by friction is particularly apt to occur by the handling incident to the forming operation when the electrode is filmed prior to its immersion in the electrolyte, as is the case in the manufacture of an electrolytic condenser.

The object of the present invention is to provide an electrolytic cell in which the filming electrode is supported in a manner not only to protect the film during the process of manufacture but also to preserve it against damage during normal use.

With this object in view, the present invention consists in certain novel features of construction, combinations and arrangements of parts hereinafter described and particularly defined in the claims.

In the accompanying drawings, Fig. 1 is an elevation in section on line 1—1 of Fig. 2 of an electrolytic cell embodying the features of the present invention; Fig. 2 is a plan view of the cell; and Fig. 3 is a section on line 3—3 of Fig. 1.

The apparatus shown in the drawings comprises an electrolytic condenser having a filming electrode of extended surface adapted to be immersed in an electrolyte and cooperating with a non-filming electrode. The filming electrode has deposited upon it a thin film which acts as the dielectric of the condenser. The non-filming electrode, as is usual in electrolytic condensers, is adapted to be connected to a negative terminal and the filming electrode to the positive terminal, whereby a direct electrical conduction through the electrolyte is avoided, thus insuring that the only current flow between electrodes under an applied potential will be the charging current of the condenser.

The preferred embodiment of the invention illustrated in the drawings comprises a container 4 adapted to receive an electrolyte in which is immersed a filming electrode assembly indicated generally at 6 and a non-filming electrode 8. The filming and non-filming electrodes are preferably of aluminum and nickel respectively, and the electrolyte consists of a mixture of borax and boric acid.

The filming electrode assembly includes the electrode proper which consists of a unitary, thin sheet 9 of aluminum connected together at its ends and arranged to form a hollow rectangle, as indicated in Fig. 3, the sides of the rectangle being formed with a plurality of closely spaced folds 10 which provide an extended surface to the electrode. The electrode sheet is supported at opposite corners of the hollow rectangle by a pair of rigid rectangular frames 12, each formed from an integral strip of filming material such as aluminum. Each frame is of rectangular form, opposite arms of the support being received between adjacent end folds of the sides of the electrode sheet, as shown in Fig. 3. The supports are provided with ears 14 which are struck up from each arm of the support and turned down over and welded to the outer surfaces of the filming electrode sheet. The end folds of each sheet are thus not only maintained in good electrical contact with the supports but are also held in rigid mechanical engagement therewith so that damage to the film by separation of portions of the electrode is eliminated. The end portions of the sheet are held under a pair of ears of the supports to complete the hollow rectangle, as indicated at 15. The two supports 12 are connected together by a cross bar 18 which is riveted to each of the supports 12 at the bottom thereof.

The electrode assembly is supported from a cover 20 which is adapted to be attached to the container by an annular threaded member 22, a suitable packing 24 being provided between the upper rim of the container and the cover to prevent leakage of the electrolyte. Connection of the anode assembly to the cover is afforded by bolts 26 which are welded to the rectangular supports 12. A packing 28 surrounds each bolt and is held in position by suitable nuts threaded on the bolts on opposite sides of the cover. The non-filming electrode is threaded at its upper end and is similarly attached to the cover. Terminals or soldering lugs 30 are connected to the respective electrodes of the cell to permit connection into an external circuit.

In order to permit evaporation of moisture and gases from the interior of the cell, the cover is provided with a vent plug 32 which has a central opening 34 and which is covered by a threaded member 36 having a central opening registering with the opening of the plug. A flexible washer 38 is interposed between the plug and the cover. After assembly of the vent plug and cover, a slight opening is made in the washer 38 by inserting a pin through the central opening of the cover member. Because of the resilience of the washer, this opening tends to close and affords protection against excessive evaporation of water from the interior of the cell but at the same time is sufficient to prevent accumulation of gases which may be formed during the operation of the cell, these gases tending under their pressure to vent through the opening of the washer.

When the cell is to be used as an electrolytic condenser, the entire filming electrode assembly, including the filming sheet and the supports therefor, are formed with the dielectric film, preferably according to the method disclosed in the patent to Mershon, No. 1,012,889, granted December 26, 1911, according to which the electrode is formed at a temperature and a voltage in excess of those to be employed under usual operating conditions. After this operation the electrodes are mounted on the cover of the container, and then the entire assembly is transferred to the container and securely locked in position with the electrodes received in the electrolyte.

It will be seen that the present invention provides an electrolytic cell in which the electrodes are supported so as to prevent damage to the film under practically all conditions of use. The filming electrode may be of extremely large surface but is nevertheless supported with sufficient rigidity to prevent frictional or rubbing engagement between adjacent folds which might prove destructive to portions of the film. Moreover, points of contact between the filming electrode proper and its support are maintained with sufficient rigidity so that there is no tendency toward separation and consequent breaking of the film which completely encloses all parts of the electrode structure.

Having thus described the invention, what is claimed is:

1. An electrolytic cell comprising a non-filming electrode, and a filming electrode assembly including a continuous metallic sheet having a plurality of closely spaced folds, and a rectangular supporting frame for the sheet having portions of the sheet secured to opposite sides thereof in electrical contact.

2. An electrolytic cell comprising a non-filming electrode, a filming electrode support including a plurality of rigid arms, and a filming electrode including a unitary sheet surrounding and attached to the arms and connected together at its ends, the sheet having an extended surface formed by a plurality of closely spaced folds.

3. An electrolytic cell comprising a non-filming electrode, filming electrode supports consisting of rigid upright rectangular frames, and a filming electrode consisting of a thin metallic sheet encircling the supports in the form of a hollow rectangle and attached thereto, the sheet being formed with a plurality of closely spaced folds.

4. An electrolytic cell comprising a non-filming electrode, filming electrode supports consisting of a pair of integral strips forming a hollow rectangular frame, means connecting the strips to form a rigid assembly, a filming electrode including a continuous metallic sheet encircling the supports to form a hollow rectangle, the sheet being formed with a plurality of closely spaced folds, and lugs formed on the supporting members and firmly engaging with portions of the sheet.

5. An electrolytic cell comprising a non-filming electrode, filming electrode supports of filming material including rigid upright strips and a filming electrode consisting of a continuous metallic sheet having a plurality of closely spaced folds and having portions thereof secured to opposite sides of the supporting strips in electrical contact.

In testimony whereof I have signed my name to this specification.

SAMUEL T. WOODHULL.